July 11, 1972 R. KORPMAN 3,676,202

PRESSURE-SENSITIVE ADHESIVE TAPE

Filed Oct. 7, 1969

INVENTOR
RALF KORPMAN
BY
Charles A. Harris
ATTORNEY

United States Patent Office 3,676,202
Patented July 11, 1972

3,676,202
PRESSURE-SENSITIVE ADHESIVE TAPE
Ralf Korpman, East Brunswick, N.J., assignor to
Johnson & Johnson
Continuation-in-part of application Ser. No. 720,811,
Apr. 12, 1968. This application Oct. 7, 1969,
Ser. No. 864,512
Int. Cl. C09j 7/02
U.S. Cl. 117—122 P
7 Claims

ABSTRACT OF THE DISCLOSURE

A normally tacky and pressure-sensitive adhesive tape having superior properties, wherein the adhesive is based upon the combination of a particular type of elastomeric and thermoplastic block polymer with a tackifier comprising a major proportion of polymerized piperylene or isoprene and piperylene structures. The block polymer has the structure ABA, wherein A is a thermoplastic polymer block of a vinyl arene and possesses a glass transition temperature above normal room temperature and B is an elastomeric polymer block of isoprene, and the thermoplastic A block composes about 8–35 percent by weight of the block polymer.

---

Figure 1:
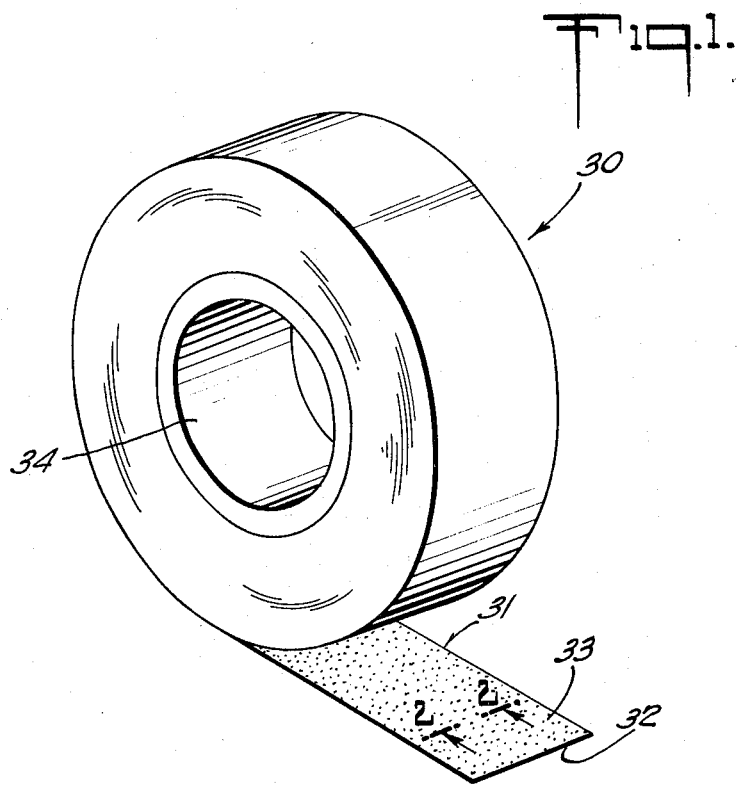

The present invention relates to normally tacky and pressure-sensitive adhesive tapes possessing superior adhesive properties.

This application is a continuation-in-part of my copending application Ser. No. 720,811, filed Apr. 12, 1968 and now abandoned.

Most commercial pressure-sensitive tapes are based on some form of natural rubber. The supply of natural rubber is sometimes questionable, particularly in times of world stress, and its price varies considerably. Its characteristics also vary with the source. Efforts to develop a rubber supply to produce more uniform and improved pressure-sensitive tapes from synthetic sources have not been too successful. Adhesives based on polyisobutylene or polyvinyl ether have poor internal strength and poor resistance to shear forces. In addition, the polyvinyl ether adhesives are too expensive for most applications. Good performing acrylic pressure-sensitive adhesives are available but are too costly for a majority of applications. Uncured adhesives based on butadiene-styrene (SBR) polymers or synthetic polyisoprenes do not have the internal strength necessary to meet many of the tape applications requiring high resistance to shear.

U.S. Letters Patent No. 3,239,478 is alleged to have solved many of these problems by using a block polymer elastomer in combination with a tackifier and appreciable quantities of oil to soften the adhesive and make it pressure-sensitive. These adhesives are extremely thermoplastic and lack resistance to shear, especially at slightly elevated temperatures.

I have disclosed that, if the adhesive is formulated with a major proportion by weight of the total elastomers of a specific type of block polymer in combination with a specific type of tackifier, and without any oil as suggested in the above described U.S. patent, far superior pressure-sensitive adhesive tapes result as compared with similar tapes based on natural rubber elastomers.

This block polymer is both elastomeric and thermoplastic and has the structure ABA, wherein A is a thermoplastic polymer block of a vinyl arene and possesses a glass transition temperature above normal room temperature and B is an elastomeric polymer block of isoprene, or a copolymer therewith and the block polymer consists of about 8–35 percent by weight of A blocks. Preferably, the A blocks have molecular weights of at least about 7,000. The tackifier used in combination therewith is a synthetic resin consisting essentially of polymerized structures of aliphatic dienes of 5 or 6 carbon atoms the major proportion of which dienes are piperylene, or piperylene and isoprene. With this combination of block polymer and tackifier, no oil is needed to produce an adhesive tape with pressure-sensitive tack. Furthermore, adhesives made in accordance with my invention show superior properties even at somewhat elevated temperatures. In fact, my invention makes it possible to formulate adhesives both superior to and cheaper than the crude rubber base adhesive formerly used.

An additional advantage of this invention is the low viscosity obtained when the adhesive formulation is dissolved in conventional solvents. This makes it possible to raise the solids content of the adhesive mass to be coated and results in a lower solvent cost and a shorter drying time. These adhesives also are readily applied by calender coating techniques to provide superior tapes according to this invention.

It also is within the scope of this invention to formulate curing adhesives and produce precured adhesive tapes as will be described more fully hereinafter.

The block polymer ABA, useful in this invention, consists of an elastomeric polymer block B polymerized from isoprene, either alone or in conjuction with other monomers. The thermoplastic blocks A preferably are polymerized from styrene or styrene homologues and exhibit a glass transition above normal room temperature, say about 25° C. and preferably above 50° C. The A blocks preferably have a molecular weight of at least about 7,000 and furthermore constitute about 8–35 and preferably about 10–20 percent of the total polymer as indicated hereinbefore. The above described ABA block polymer may be used as the sole elastomeric constituent of the adhesive, or the adhesive may include a minor amount by weight of the total elastomers of an additional more conventional diene elastomer such as natural rubber, or polymers based on butadiene, isoprene, butadiene-styrene (SBR rubber), butadiene-acrylonitrile (NBR rubber), butyl rubber, or the like, and also may include other block polymers based on such diene elastomers. When the term "total elastomers" is used herein it shall mean the aggregate of the elastomeric and thermoplastic block polymer and the additional diene elastomer.

The synthetic tackifier resin of this invention consists essentially of polymerized structures of aliphatic dienes of 5 or 6 carbon atoms, the major proportion of which are of piperylene, or piperylene and isoprene. Preferably, the resin contains at least about as great a proportion of piperylene structures as isoprene structures by weight of the piperylene and isoprene. When the term "resin" is used herein in connection with the synthetic tackifier resin of this invention, it means a nonelastomeric polymeric material having a relatively sharp melting point.

Preferably the tackifier is polymerized directly or indirectly from a $C_5$ stream of aliphatic petroleum derivatives containing a major proportion of piperylene and isoprene monomers. The tackifier may be polymerized directly from the stream or the stream may first be dimerized and/or trimerized and then further polymerized as generally described in U.S. Letters Patent No. 3,290,275. The $C_5$ stream referred to above, may include small amounts of $C_6$ and even higher chain length monomers as well as some of lower chain length. However, the character of the stream is essentially that attributable to its $C_5$ components. One stream of this type may comprise about 25 percent piperylene, 25 percent isoprene and 50 percent tertiary amylenes as the major constituents. A portion of this stream will become polymerized, whereas another portion will not. The unpolymerized portion is made up mainly of the amylenes, whereas the polymerized portion (now the tackifier resin) is made up mainly from the piperylene and isoprene.

C₅ streams useful in preparing the tackifiers of this invention may vary substantially in composition. For instance, another example of such a stream comprises about 60 percent piperylene, 10 percent isoprene, 5 percent cyclopentadiene, 15 percent 2-methyl butene and 10 percent C₆ dimer. A small amount of isoprene may be added to this stream to raise the isoprene content in the resulting tackifier if desired. A preferred stream useful in preparing tapes according to this invention is that of Wingtack 95 resin described in more detail hereinafter, following the examples, wherein the ratio of piperylene to isoprene structures is approprixately 8 or 9 to 1. As indicated hereinbefore, the tackifier resin may be polymerized directly from a primarily monomer stream or the stream may first be dimerized or trimerized and then further polymerized. Other components such as the isoprene mentioned above, or a small amount of a polyterpene resin, may be added to the stream during or prior to polymerization to modify its properties somewhat.

The amount of the tackifier resin may range broadly from about 25 to about 125 parts, and preferably about 50–85 parts, per one hundred parts of the total elastomers. When the term "parts" is used hereinafter, it shall mean parts per one hundred parts of the total elastomers unless otherwise indicated.

For cured or curing adhesives, any conventional diene elastomer curing system may be employed, although it is preferred to use an oil soluble heat reactive aldehyde resin as the curing agent. To obtain the best balance of properties, I suggest the use of about 2 to 50 parts of the aldehyde resin and preferably about 7 to 20 parts. Conventional accelerators such as zinc resinate or alkaline fillers may be used, as may acid accelerators such as disclosed in U.S. Letters Pat. No. 3,231,419. Zinc resinate is preferably used in amounts less than 30 parts in order to retain sufficient tack.

Other conventional additives may be used in the adhesive. Antioxidants and heat stabilizers should be used for best heat stability. 2,5 ditertiary amyl hydroquinone, tertiary butyl cresol, and amine type antioxidants are usually employed. The zinc salts of the alkyl dithiocarbamates are frequently used as heat stabilizers. Ultra-violet absorbers also may be added to the adhesive when improved outdoor weathering is required.

Conventional pigments and fillers such as zinc oxide aluminum hydrate, carbon black, clay, calcium carbonate and others may be used to extend the adhesive and alter its appearance. Colored pigments may be used when a colored adhesive is desired.

Figure 2:
Figure 2:
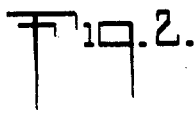

Other and further advantages of this invention will appear to one skilled in the art from the following description, examples and claims; taken together with the drawings wherein: FIG. 1 is a view in perspective of a roll of tape according to one embodiment of the invention and FIG. 2 is a greatly enlarged sectional view taken along the line 2—2 of FIG. 1.

Referring to the drawings; there is shown a roll 30 of pressure-sensitive adhesive tape 31, according to one embodiment of this invention, which comprises a flexible backing sheet 32 and a layer of pressure-sensitive adhesive 33 coated on one major surface of said backing. The tape 31 normally is wound upon itself around a core 34 with the adhesive side of the tape facing inwardly toward the core. The backing sheet 32 may be a plastic film, paper, or any other suitable material and the tape may include various other layers or coatings, such as primers, release coatings, and the like, which are used in the manufacture of pressure-sensitive adhesive tapes.

The following examples are given only by way of illustration and are not intended to limit the scope of the present invention in any way. In the examples all proportions are given in parts per one hundred parts of the total elastomers unless otherwise indicated. Tapes according to this invention are formulated as indicated in the following Table A.

TABLE A

| | Example | | | | | | | | |
|---|---|---|---|---|---|---|---|---|---|
| | I | II | III | IV | V | VI | VII | VIII | IX |
| Block polymer A (Kraton 107) | 100 | 100 | 60 | 100 | | | 100 | 70 | 100 |
| Bolck polymer B | | | | | 100 | | | | |
| Block polymer C | | | | | | 100 | | | |
| Synthetic polyisoprene rubber | | | | 40 | | | | 30 | |
| Wingtack 95 tackifier | 25 | 80 | 60 | 75 | 80 | 80 | 100 | 100 | 50 |
| TPO No. 2 tackifier | | | | 50 | | | | | |
| Heat curing phenolic resin | | | | | | | | | 20 |
| Zinc resinate | | | | | | | | | 10 |
| Zinc dibutyl dithiocarbamate | | 1 | 1 | 2 | 1 | 1 | 1 | 1 | 2 |
| 2,5 ditertiary amyl hydroquinone | 1 | 0.5 | 0.5 | 1 | 0.5 | 0.5 | | | 1 |
| Solids in toluene | 30 | 50 | 40 | 60 | 50 | 50 | 50 | 40 | 50 |

The adhesive formulations of Examples I–VI are coated on a conventional impregnated and backsized creped paper masking tape backing at approximately 1.5 oz. per square yard for Examples I, III, V and VI; 1.25 oz. per square yard for Example II and 1.4 oz. per square yard for Example IV, all at dry weight. The coated backings then are dried and then slit into tapes approximately 1" wide and wound upon themselves in the form of rolls with the adhesive side of the tape facing inwardly. Each of these tapes possess excellent resistance to roll distortion and gapping and a moderate unwind adhesion from the roll when stored at elevated temperatures, i.e., 120°–150° F. The tapes of Examples II–VI all possess high tack and perform well as a masking tape for use at temperatures below about 175° F. The tapes of Examples II, V and VI also exhibit excellent hold properties and high adhesion at these temperatures. The tape of Example I is formulated for relatively low adhesion and high film strength and is particularly useful for protective paper sheeting, and the like. The tape of Example IV is a low cost formulation utilizing a relatively inexpensive supplementary tackifier, TPO #2.

The formuations of Examples VII and VIII are coated at about 1.2 oz. per square yard, dry weight, on one side of a silicone interliner and then dried as described for the previous examples. This construction provides a transfer film tape which possesses excellent film strength as well as good tack and adhesion.

The adhesive formulation of Example IX illustrates a curing adhesive of this invention. It is coated on one side of the masking tape backing of Example I as described in that example, and then cured in situ by exposing the coated backing to a temperature of 350° F. for about 1 minute to produce a precured pressure-sensitive adhesive tape according to this invention. The resulting tape possesses excellent high temperature properties for a variety of uses.

Kraton 107 (block polymer A) is an elastomeric and thermoplastic styrene-isoprene ABA block polymer sold by the Shell Chemical Company. This polymer is believed to have a styrene content of about 12–15%, i.e., closer to 15%, a solution viscosity of 2900 cps. and a number average molecular weight of about 110,000–125,000. Whenever solution viscosity is mentioned in this application, it refers to viscosity measured at 23° C. in a toluene solution at a solids content of about 25%. Block polymers B and C are similar elastomeric and thermoplastic styrene-isoprene ABA block polymers. However, block polymer B has a styrene content of about 10% and a number average molecular weight of about 160,000, whereas block polymer C has a styrene content of about 20% and a number average molecular weight of about 130,000.

The synthetic polyisoprene rubber used in the above examples is sold commercially by the Chemical Division of the Goodyear Tire and Rubber Company as Natsyn 410 rubber. This polymer has a Mooney viscosity at 212° F. of 50+5 units.

Wingtack 95 is a synthetic tackifier resin believed to have been polymerized mainly from a mixture of piperylene and isoprene, and which possesses a melting point of about 95° S. It is offered commercially by Goodyear Tire and Rubber Company TPO #2 is a liquid tackifier which is a combination of mainly a petroleum hydrocarbon polymeric resin with a minor amount of saturated napthenic oil and wherein the hydrocarbon portion consists of styrene, ring substituted styrenes and indene, as well as a small percentage of isoprene, and is offered commercially by the Velsicol Chemical Corporation.

The heat curing phenolic resin used herein is formed from octyl phenol and formaldehyde and is of the type generally called oil soluble. It has a melting point of approximately 80° C. and is sold commercially by the Rohm and Haas Company as Amberol ST-137.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A pressure-sensitive adhesive tape which comprises a flexible backing sheet and a layer of a normally tacky and pressure-sensitive adhesive coated on one major surface of said sheet, said adhesive comprising a major proportion by weight of the total elastomers of an elastomeric and thermoplastic block polymer of the structure A-B-A, wherein A is a thermoplastic polymer block of a vinyl arene and possesses a glass transition temperature above normal room temperature and B is an elastomeric polymer block of isoprene, said thermoplastic A blocks composing about 8-35 percent by weight of the block polymer, and about 25-125 parts by weight of the total elastomers of a synthetic tackifier resin consisting essentially of polymerized structures of 5 or 6 carbon atoms, the major proportion of said polymerized structures being piperylene structures and isoprene structures and a minor proportion of said polymerized structures being amylene structures.

2. A pressure-sensitive adhesive tape according to claim 1, wherein the polymerized structures of said tackifier resin comprise at least about as great a proportion of piperylene structures as isoprene structures.

3. A pressure-sensitive adhesive tape according to claim 1, wherein said thermoplastic A blocks compose about 10-20 percent by weight of the block polymer.

4. A pressure-sensitive adhesive tape according to claim 3, wherein said thermoplastic A blocks compose about 12-15 percent by weight of the block polymer.

5. A pressure-sensitive adhesive tape according to claim 1, wherein the tackifier is present in the amount of about 50-85 parts by weight of the total elastomers.

6. A pressure-sensitive adhesive tape according to claim 1, wherein said vinyl arene is styrene.

7. A pressure-sensitive adhesive tape according to claim 1, wherein the total elastomers in said adhesive consist essentially of said elastomeric and thermoplastic block polymer.

References Cited
UNITED STATES PATENTS

| | | | |
|---|---|---|---|
| 2,940,960 | 6/1960 | Tegge et al. | 260—85.3 |
| 3,239,478 | 3/1966 | Harlan | 260—45.85 X |
| 3,290,275 | 12/1966 | Brandt | 260—80 7 X |

WILLIAM D. MARTIN, Primary Examiner

B. D. PIANALTO, Assistant Examiner

U.S. Cl. X.R.

117—122 PA, 122 PF